United States Patent
Cavender et al.

(10) Patent No.: US 12,258,435 B1
(45) Date of Patent: Mar. 25, 2025

(54) METHOD FOR PREPARING LOW DENSITY POLYURETHANES USING CATALYSTS THAT ARE FREE FROM TERTIARY AMINES AND TIN

(71) Applicant: PATCHAM USA LLC, Fairfield, NJ (US)

(72) Inventors: Stephen Edward Cavender, Charlotte, NC (US); Rajeshkumar K. Patel, Sharjah (AE); Nishith K. Patel, West Orange, NJ (US)

(73) Assignee: PATCHAM USA LLC, Fairfield, NJ (US)

( * ) Notice: Subject to any disclaimer, the term of this patent is extended or adjusted under 35 U.S.C. 154(b) by 0 days.

(21) Appl. No.: 18/936,147

(22) Filed: Nov. 4, 2024

Related U.S. Application Data

(63) Continuation-in-part of application No. 18/434,486, filed on Feb. 6, 2024.

(51) Int. Cl.
*C08G 18/22* (2006.01)
*C08G 18/08* (2006.01)
*C08G 18/48* (2006.01)
*C08G 18/76* (2006.01)

(52) U.S. Cl.
CPC .......... *C08G 18/227* (2013.01); *C08G 18/14* (2013.01); *C08G 18/225* (2013.01); *C08G 18/4829* (2013.01); *C08G 18/7614* (2013.01); C08G 2110/0008 (2021.01); C08G 2110/0083 (2021.01)

(58) Field of Classification Search
CPC ... C08G 18/161; C08G 18/225; C08G 18/227
See application file for complete search history.

(56) References Cited

U.S. PATENT DOCUMENTS

| | | | |
|---|---|---|---|
| 3,073,788 A | 1/1963 | Hostettler et al. | |
| 3,342,757 A | 9/1967 | Considine et al. | |
| 4,584,362 A | 4/1986 | Leckart et al. | |
| 8,530,534 B2 | 9/2013 | Burdeniuc et al. | |
| 8,841,403 B2 | 9/2014 | Schmitz et al. | |
| 10,125,234 B2 | 11/2018 | Hoffman et al. | |
| 10,731,019 B2 | 8/2020 | Zhang et al. | |
| 11,274,228 B2 | 3/2022 | Hoffmann et al. | |
| 2007/0259776 A1 | 11/2007 | Bosch et al. | |
| 2007/0259982 A1 | 11/2007 | Burdeniuc et al. | |
| 2007/0259983 A1 | 11/2007 | Burdeniuc et al. | |
| 2008/0269371 A1 | 10/2008 | Holeschovsky et al. | |
| 2011/0015290 A1 | 1/2011 | Schmitz et al. | |
| 2012/0220677 A1 | 8/2012 | Williams et al. | |
| 2015/0240023 A1* | 8/2015 | Hoffman | C08J 9/12 521/124 |
| 2018/0273671 A1 | 9/2018 | Guo et al. | |
| 2020/0181450 A1 | 6/2020 | Hoffmann et al. | |

FOREIGN PATENT DOCUMENTS

| | | | | |
|---|---|---|---|---|
| CN | 104558469 A | * | 4/2015 | ........... C08G 18/163 |
| EP | 1852448 B1 | | 8/2011 | |
| WO | 2024022832 A1 | | 2/2024 | |
| WO | WO-2024022833 A1 | * | 2/2024 | ......... B01J 31/0237 |

OTHER PUBLICATIONS

Machine Translation of CN104558469A. Apr. 29, 2015. (Year: 2015).*
Levent et al. Heterobimetallic complexes composed of bismuth and lithium carboxylates as polyurethane catalysts—alternatives to organotin compounds. Green Chemistry, 2021, 23, 2747-2755. (Year: 2021).*
U.S. Appl. No. 18/434,486, filed Feb. 6, 2024.
Tan et al, "The Synthesis of Low-Viscosity Organotin-Free Moisture-Curable Silane-Terminated Poly(Urethane-Urea)s" Polymers, 2018, 10, published Jul. 16, 2018, 16 pages.

* cited by examiner

*Primary Examiner* — Stephen E Rieth
(74) *Attorney, Agent, or Firm* — HAYES SOLOWAY P.C.

(57) ABSTRACT

Disclosed is a method for preparing a soft, water blown, polyurethane foam product, or microcellular elastomer using a stable, liquid, tertiary amine and tin-free polyurethane catalyst. The catalyst contains a combination of bismuth and sodium carboxylates.

5 Claims, No Drawings

METHOD FOR PREPARING LOW DENSITY POLYURETHANES USING CATALYSTS THAT ARE FREE FROM TERTIARY AMINES AND TIN

CROSS REFERENCE TO RELATED APPLICATION

This application is a continuation-in-part of U.S. patent application Ser. No. 18/434,486, filed Feb. 6, 2024, the entire contents of which are hereby incorporated by reference.

FIELD OF THE INVENTION

This invention pertains to an amine-free, tin-free catalyst to be used in the production of principally water-blown/initiated, foamed urethane polymers. These include but are not limited to soft polyurethane foam, high resiliance polyurethane foam, integral skin foam, urethane spray foams and microcellular urethane elastomers.

BACKGROUND AND SUMMARY

Polyurethanes are addition polymers prepared by reacting polyfunctional isocyanates with polyols. Today there is a vast array of polyols and quite a few polyfunctional isocyanates, giving rise to many potential polyurethanes covering an array of end-products. Chemical reactions take place between these liquid components producing high molecular weight, "solid" polymers. The reaction between poly isocyanates and polyols is the actual urethane reaction and is also termed the Gel reaction.

Additional primary and secondary reactions occur during the urethane curing process, most prominent of which is the rection of isocyanate with water that is either incorporated into the formulation or present from moisture in polyol components or from air. A byproduct of this reaction, carbon dioxide gas, can be captured in the polyurethane matrix giving rise to foams for sponge-like materials or for density reduction in elastomeric type products. This isocyanate/water reaction is termed the Blow reaction. The blow reaction is often the first reaction to occur and as such is also referred to as the initiating reaction. Some systems are formulated containing a larger amount of water in order to utilize the blow for significant gas generation as in the production of "water-blown" foams.

Whilst the blow reaction is commonly employed to create foam, supplemental, physical blowing agents are frequently incorporated as well. These materials boil at relatively low temperatures, utilizing heat either generated from the blow and gel reactions or externally applied.

Another prominent reaction is isocyanate reacting with isocyanate producing polyisocyanurates (PIR). This polymerization reaction produces a high proportion of trimers and is mostly referred to as Trimerization. It has more significance in systems with a high isocyanate index>>100. Polymerization of the unreacted isocyanate groups in the polyisocyanurate and subsequent reaction with polyols produces polyisocyanurate/polyurethane (PIR/PUR) which are more rigid and fire resistant than their straight polyurethane counterparts.

Catalysts are employed to bring about these reactions in a workable timeframe and to reduce the amount of supplemental, external heat that may otherwise be needed.

It is well known that polyurethane catalysts are from two distinct chemical types, tertiary amines, and metal-based materials. These catalysts normally have some activity in all three of these primary reactions, gel, blow, trimerization but are often generalized according to the reaction that they have the most effect upon, for example, tin catalysts demonstrate a modicum of activity towards the blow reaction but substantial activity towards the gel reaction; they are routinely called a Gel catalysts.

Catalysis of the blow reaction seems to occur far more readily by an alkaline mechanism, which is highly suited to amines which can be quite strongly alkaline. Conversely, metal carboxylates, the most commonly employed of which, tin, bismuth and zinc, tend to be Lewis acids.

Quite an array of tertiary amine catalysts are employed in the industry and they are utilized for the blow, gel or trimerization reaction. Several metal-based catalysts are also employed, and they are typically very good for the gel or trimerization reactions but demonstrate very little catalytic activity towards the blow reaction.

Although metal-based catalysts have found acceptance in many commercial coatings, adhesives, sealants, and elastomers (C.A.S.E.) applications, their use in urethane-based flexible and semi-flexible foams has been limited due to their relatively poor blow reaction catalysis. Tertiary amines are currently the industry standard polyurethane blow catalyst.

Essentially, the blow reaction, directly and indirectly through the effect of its exothermic activity upon incorporated physical blowing agents, generates gas that creates foam, and the gel reaction seals the foam in the polymer matrix. Formulation of polyurethane foams and MUE's (microcellular urethane elastomers) required these competing blow and gel reaction to be synchronized/balanced. Insufficient or slow gelation and the foam structure will collapse whilst overly aggressive gel reaction will create thick irregular cell walls and cause cracking when gas is subsequently generated. Both scenarios create material with far higher density than required.

Reaction rates between isocyanate and polyol vary according to the chemical structure of these raw materials; a gel/blow catalyst combination for one system may not provide the desired balance for another. Reaction rates of gel and blow must be carefully balanced in each individual system which is achieved by adjusting the amounts of blow and gel predominant catalysts incorporated. Further, synergy is often observed between tertiary amine and metal-based catalysts and between different types of metal-based catalysts when used together.

Whilst tertiary amines are effective, they almost exclusively possess one or more highly undesirable characteristics. That is, they have foul odors, high volatility, low flash point, corrosive, high cost and significant toxicity. Emission of volatile tertiary amines during foam processing may cause loss of activity whilst subsequent emissions from the resulting consumer products may produce other liabilities. WO 2024022832A1 Burdeniuc et al. also alludes to the detrimental effects of tertiary amines on the stability of HFO blowing agents in polyurethane spray foams.

Tin-based catalysts are highly effective and have become the preferred catalysts for the gel reaction, but whilst presently they have not been banned, they are under scrutiny due to toxicity concerns. Many show hydrolysis issues that cause them to lose activity upon incorporation in a polyol/water component system.

Today, blow/gel balanced catalyst combinations employed in lower density polyurethanes are primarily combinations of tertiary amines and tin catalysts. For example US 20080269371A1 Ulrich Holeschovsky, Dave Schulte entitled: Polyurethane compound and shoe soles made therefrom, lists catalysts selected from the group consisting of triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, dibutyltin dilaurate, dibutyltin diacetate, stannous chloride, dibutyltin di-2-ethyl hexanoate, stannous oxide, and combinations thereof.

Chemical "sustainability" is of increasing importance and inventions that can replace substances possessing harmful properties with those that are more agreeable is an ongoing requisite so there is a desire for replacement of both tertiary amines and tin based catalysts.

This invention is directed to liquid, polyurethane catalyst combinations that can be used as the sole catalyst, achieving desired blow/gel balances for a variety of polyurethane systems. It is unique in that prior catalyst inventions advocate the use of tertiary amines and/or tin-based catalysts in part or whole for balanced catalysis of the gel and blow reaction.

U.S. Pat. No. 3,073,788 (Hostettler et al., 1963), disclosed the use of soaps of alkali metals, as blow catalysts. Sodium carboxylates (soaps), although they have weak catalytic activity towards the blow reaction, demonstrate even less activity towards the gel reaction confirming them as (predominantly) blow reaction catalysts. Their weak activity requires large doses which may account for apparent non-existence as commercial blow catalysts. U.S. Pat. No. 3,073,788 suggests using them in combination with a gel catalyst selected from a variety of tin products, but most particularly stannous octoate.

U.S. Pat. No. 3,342,757A (1967 M&T Chemicals) also notes alkali metals as blow catalysts in polyurethane foam but provided examples of products they quote as being "generally solid state at room temperature". This common detriment would render such catalysts harder to handle and incorporate and unless they can achieve solubility during incorporation, would reduce if not negate their efficacy. Liquid products are desired for handling, incorporation, consistency and efficacy and can be achieved through selection of the anionic (carboxylate) component and a suitable solvent. This component is significant in determining the physical state and compatibility with the reactants as well as affecting the acidic/basic nature of the catalyst and thus its actual catalytic efficacy.

Bismuth has reduced toxicity compared to many other metals and has even been used as a prominent component of drugs and ointments for human use. Polyurethane catalysts based on bismuth have for a while been considered as possible substitutes for a traditional tin-based gel catalysts in some urethane related systems, for example: U.S. Pat. No. 4,584,362A (Arthur R. Leckart et al. 1986) described bismuth salts of carboxylic acids having from 2 to 20 carbon atoms, as polyurethane, gel, reaction catalysts and Tan, C.; Luona, V.; Tirri, T.; Wilen, C.-E. ("The synthesis of low-viscosity organotin-free moisture-curable silane-terminated polyurethane-ureas"), Polymers 2018, 10, 781 concurs. However, bismuth catalysts tend to be less effective than their tin counterparts thus requiring higher dosage. Furthermore, the sensitivity of some bismuth catalysts to water limits their applicability in PU systems containing water. Various methods have been suggested to produce bismuth catalysts with improved hydrolytic stability, and we have noticed that one such method is a combination with more strongly electro-positive metals, such as alkali metals. Several instances of bismuth carboxylates in combination with alkali metal compounds have been developed as system specific catalysts: U.S. Pat. No. 10,125,234B2 (Robert Francis Hoffman et al. 2018) discloses the use of specific bismuth and potassium carboxylates as a tin free catalyst in polyisocyanurate (rigid) foams. Emre Levent et al Paper in the Royal Society of Chemistry titled: Heterobimetallic complexes composed of bismuth and lithium carboxylates as polyurethane catalysts-alternatives to organotin compounds 2021, demonstrating improved efficacy of bismuth carboxylates as polyurethane coatings catalysts through inclusion of lithium.

This invention utilizes Bismuth carboxylates of monocarboxylic acids of 2-17 carbons, preferably 8-10 carbons and more preferably bismuth isononanoate or bismuth neodecanoate, combinations in conjunction with sodium carboxylates of monocarboxylic acids of 2-17 carbons, preferably 8-10 carbons and more preferably sodium isononanoate and/or sodium neodecanoate and combinations thereof in a liquid form through dissolution in low molecular weight glycols and/or glycol ethers. It provides a stable, liquid, catalyst that can simultaneously replace tertiary amines/tin catalyst combinations employed as catalysts for the production but not limited to soft polyurethane foam, high resilience polyurethane foam, integral skin foam, urethane spray foams and microcellular urethane elastomers.

According to one embodiment of the invention there is provided a stable, liquid polyurethane catalyst that is free from tertiary amines and free from tin catalysts for use as a sole catalyst in the production of polyurethane polymers, wherein the catalyst comprises a combination of both bismuth and sodium carboxylates.

In one embodiment, the bismuth carboxylate comprises a bismuth carboxylate of monocarboxylic acids of 2-17 carbon atoms.

In another embodiment the bismuth carboxylate of a monocarboxylic acid has 8-10 carbon atoms.

In still yet another embodiment the bismuth carboxylate comprises bismuth isononanoate or bismuth neodecanoate, and a combination thereof dissolved in carboxylic acid, a glycol and/or a glycol ether.

In yet another embodiment the sodium carboxylate comprises a sodium carboxylate of a monocarboxylic acid of 2-17 carbon atoms.

In yet another embodiment the sodium carboxylate has 8-10 carbon atoms.

In still yet another embodiment the sodium carboxylate comprises sodium isononanoate or sodium neodecanoate or a combination thereof dissolved in carboxylic acid, a glycol and/or a glycol ether.

In another embodiment the catalyst has a bismuth metal content of 0.1% to 24.0%.

In yet another embodiment the catalyst has a sodium metal content of 0.5% to 8.0%.

In yet another embodiment of the invention there is provided a method for preparing a water blown, low density, soft polyurethane foam product or a low density microcellular polyurethane elastomer product, comprising: (a) providing a premix containing a polyol, water and a tertiary amine and tin-free blow/gel catalyst combination, wherein the catalyst comprises a combination of a bismuth carboxylate of a monocarboxylic acid(s) of 2-17 carbon atoms, and a sodium carboxylate of a monocarboxylic acid(s) of 2-17 carbon atoms, and (b) contacting the premix with poly functional isocyanate at an isocyanate index of less than 120.

In one embodiment of the method the bismuth carboxylate of a monocarboxylic acid(s) has 8-10 carbon atoms.

In another embodiment of the method the bismuth carboxylate comprises bismuth isononanoate or bismuth neodecanoate, or a combination thereof dissolved in carboxylic acid, a glycol and/or a glycol ether.

In yet another embodiment of the method the sodium carboxylate of a monocarboxylate acid(s) has 8-10 carbon atoms.

In still yet another embodiment of the method the sodium carboxylate comprises sodium isononanoate or sodium neodecanoate or a combination thereof dissolved in carboxylic acid, a glycol and/or a glycol ether.

In a preferred embodiment of the method the premix has a bismuth metal content of 0.1% to 24.0%.

In another preferred embodiment of the method the premix has a sodium metal content of 0.5% to 8.0%.

WORKING EXAMPLES

Example 1

In this example a 1.5 pcf soft foam was prepared using conventional, tertiary amine/stannous octoate catalyst combination and a comparable product made without tertiary amine or tin catalysts.

| 1.5 pcf Solf Foam Bunstock | Conventional Catalysts | Amine-free and tin-free |
|---|---|---|
| 3000 MW Conventional Polyol | 100 | 100 |
| Silicone Surfactant | 0.80 | 0.80 |
| Tertiary Amine Blow catalyst | 0.3 | |
| Tin Gel Catalyst | 0.20 | |
| Bi/Na Blow/Gel Balanced Catalyst | | 2.00 |
| Water | 4.5 | 4.5 |
| TDI (Iso index 105) | 54.86 | 54.86 |
| Cream Time/sec | 8 | 11 |
| Rise Time/sec | 65 | 107 |
| Sigh Back/in | 1/8" | 1/8" |
| Density/pcf | 1.50 | 1.48 |
| Comments | Good foam | Good foam |

Example 2

In this example a one shot flexible slabstock foam was produced using conventional, tertiary amine/stannous octoate catalyst combination and a comparable product made without tertiary amine or tin catalysts.

| One shot flexible slabstock foam | Conventional Catalysts | Amine-free and tin-free | Amine-free and tin-free |
|---|---|---|---|
| 3000 mol wt polyether triol | 100 | 100 | 100 |
| Silicon surfactant | 1.1 | 1.1 | 1.1 |
| Tertiary Amine blow catalyst | 0.3 | | |
| St.octoate (Tin-based gel catalyst) | 0.2 | | |
| Bi/Na Blow/Gel Balanced Catalyst | | 2 | 2.5 |
| Water | 4.5 | 4.5 | 4.5 |
| TDI | 59.9 | 59.9 | 59.9 |
| Cream time (sec.) | 15 | 14 | 14 |
| Top of the cup (sec.) | 72 | 62 | 51 |
| Rise time (sec.) | 127 | 130 | 116 |
| Immediate foam height (cm.) | 16.7 | 16 | 16.9 |
| Remark | Good Foam | Good Foam | Good Foam |

Example 3

In this example a spray foam was produced using conventional, tertiary amine/tin based catalyst combination and a comparable product made without tertiary amine or tin catalysts.

| Spray Foam | Conventional Catalysts | Amine-free and tin-free |
|---|---|---|
| Aromatic, high functionality polyester polyol | 60 | 60 |
| High functional mannich polyether polyol | 30 | 30 |
| High Functional Polyether polyol | 10 | 10 |
| Flame Retardant | 13 | 13 |
| Water | 2.5 | 2.5 |
| Silicone Surfactant | 1.5 | 1.5 |
| Tertiary amine blow catalyst | 0.5 | |
| Tin based gel catalyst | 0.3 | |
| Bi/Na Blow/Gel Balanced Catalyst | | 1.45 |
| HFO Blowing agent | 10 | 10 |
| polyisocyanate based on MDI | 156 | 156 |
| Cream time (sec.) | 18 | 18 |
| Top of the cup (sec.) | 33 | 32 |
| Rise time (sec.) | 56 | 58 |
| Tack free (sec.) | Immediate | Immediate |
| Foam height (cm.) | 17.3 | 17.3 |

Example 4

In this example a polyether based microcellular urethane elastomer, footwear sole was produced using conventional, tertiary amine/tin-based catalyst combination and a comparable product made without tertiary amine or tin catalysts.

| MUE (polyether) footwear soles | Conventional Catalysts | Amine-free and tin-free |
|---|---|---|
| Polyether polyol component | 100 | 100 |
| Tertiary amine blow catalyst | 0.93 | |
| Tertiary amine gel catalyst | 0.39 | |
| Tin based gel catalyst | 0.01 | |
| Bi/Na Blow/Gel Balanced Catalyst | | 0.4 |
| Water | 0.36 | 0.36 |
| MDI based prepolymer | 78 | 78 |
| Cream time (sec.) | 19 | 21 |
| Rise time (sec.) | 40 | 43 |
| Tack free (sec.) | 50 | 52 |
| Pinch (sec.) | 80 | 70 |
| Density | 0.133 | 0.135 |

Example 5

In this example a polyester based microcellular urethane elastomer, footwear sole was produced using conventional, tertiary amine/tin-based catalyst combination and a comparable product made without tertiary amine or tin catalysts.

| MUE (polyester) footwear soles | Conventional Catalysts | Amine-free and tin-free | Amine-free and tin-free |
|---|---|---|---|
| Polyester polyol component | 100 | 100 | 100 |
| Tertiary amine blow catalyst | 0.98 | | |
| Tertiary amine gel catalyst | 0.44 | | |
| Tin based gel catalyst | 0.01 | | |
| Bi/Na Blow/Gel Balanced Catalyst (1) | | 1.00 | |

-continued

| MUE (polyester) footwear soles | Conventional Catalysts | Amine-free and tin-free | Amine-free and tin-free |
|---|---|---|---|
| Bi/Na Blow/Gel Balanced Catalyst (2) | | 1.40 | |
| MDI based prepolymer | 101 | 101 | 101 |
| Cream time (sec.) | 23 | 24 | 21 |
| Rise time (sec.) | 58 | 52 | 61 |
| Tack free (sec.) | 72 | 55 | 65 |
| Density | 0.213 | 0.208 | 0.220 |

Example 6

In this example a High Resilience foam was produced using conventional, tertiary amine/tin-based catalyst combination and a comparable product made without tertiary amine or tin catalysts.

| HR foam | Conventional Catalysts | Amine-free and tin-free |
|---|---|---|
| Polyester polyol dispersion | 100 | 100 |
| Water | 2.8 | 2.8 |
| Cross linker | 2.9 | 2.9 |
| Surfactant | 1.1 | 1.1 |
| Tertiary amine blow catalyst | 0.12 | |
| St.octoate (Tin-based gel catalyst) | 0.04 | |
| Bi/Na Blow/Gel Balanced Catalyst | | 0.64 |
| TDI (at Index 105) | 33 | 33 |
| Top of the cup (sec.) | 92 | 78 |
| Rise time (sec.) | 165 | 150 |
| Tack free (min.) | 90 | 80 |
| Initial foam height (cm.) | 15 | 14.9 |

In all the above examples tertiary amine-free and tin-free catalyst combinations made from mixtures of sodium and bismuth carboxylates were able to be constructed that produced comparable properties in comparable processing times to those produced with existing combinations of tertiary amines and tin-based catalysts. These polyurethane blow/gel catalyst combinations function effectively with a variety of isocyanates and polyols employed for the production of low density, water-blown, soft foams and microcellular urethane elastomers, further characterized as having an isocyanate index of typically 85 to 105.

These tertiary-amine free and tin-free catalysts are effective for polyol/water/isocyanate systems requiring catalysis of the isocyanate/water (Blow) reaction and isocyanate/polyol (Gel) reaction but avoidance of the isocyanate/isocyanate (Trimerization) reaction.

The invention claimed is:

1. A method for preparing a water blown, soft polyurethane foam product or a microcellular polyurethane elastomer product, comprising:
   (a) providing a premix containing a polyol, water and a blow/gel catalyst combination, wherein the catalyst combination comprises a bismuth carboxylate of a monocarboxylic acid(s) of 2-17 carbon atoms, and a sodium carboxylate of a monocarboxylic acid(s) of 2-17 carbon atoms, wherein the premix is free of tertiary amine and tin catalysts, and
   (b) contacting the premix with poly functional isocyanate at an isocyanate index of less than 120.

2. The method of claim 1, wherein the bismuth carboxylate of a monocarboxylic acid(s) has 8-10 carbon atoms.

3. The method of claim 1, wherein the bismuth carboxylate comprises bismuth isononanoate or bismuth neodecanoate, or a combination thereof dissolved in carboxylic acid, a glycol and/or a glycol ether.

4. The method of claim 1, wherein the sodium carboxylate of a monocarboxylate acid(s) has 8-10 carbon atoms.

5. The method of claim 1, wherein the sodium carboxylate comprises sodium isononanoate or sodium neodecanoate or a combination thereof dissolved in carboxylic acid, a glycol and/or a glycol ether.

* * * * *